United States Patent
Ogawa et al.

(10) Patent No.: US 7,542,573 B2
(45) Date of Patent: Jun. 2, 2009

(54) PROVIDING APPARATUS, COMMUNICATION DEVICE, METHOD, AND PROGRAM

(75) Inventors: Katsuhisa Ogawa, Machida (JP); Naohiko Suzuki, Tokyo (JP); Hiroaki Nakazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 788 days.

(21) Appl. No.: 11/135,156

(22) Filed: May 23, 2005

(65) Prior Publication Data

US 2005/0273595 A1 Dec. 8, 2005

(30) Foreign Application Priority Data

Jun. 4, 2004 (JP) ............................. 2004-167213

(51) Int. Cl.
*H04L 9/08* (2006.01)
(52) U.S. Cl. ........................ 380/279; 380/255; 380/259
(58) Field of Classification Search .................. 380/279
See application file for complete search history.

(56) References Cited

U.S. PATENT DOCUMENTS

| 7,325,127 | B2 * | 1/2008 | Olkin et al. | ................. | 713/152 |
| 2001/0042201 | A1 | 11/2001 | Yamaguchi | | |
| 2004/0062399 | A1 * | 4/2004 | Takase | ........................ | 380/277 |

FOREIGN PATENT DOCUMENTS

JP 2002-271309 A 9/2002

OTHER PUBLICATIONS

Cheng, An Architecture for the Internet Key Exchange Protocol, 2001, Retrieved from the Internet on Sep. 14, 2008: <URL: http://www.research.ibm.com/journal/sj/403/cheng.pdf>.*
Tamura, Yanagiya, Bessho, Takagi, A study on secured VoIP services with IP mobility technologies, Mar. 2003, pp. 319-322, NIT Network systems Laboratories, Tokyo, Japan.

* cited by examiner

*Primary Examiner*—Minh Dinh
(74) *Attorney, Agent, or Firm*—Canon U.S.A. Inc., IP Division

(57) ABSTRACT

A providing apparatus provides information required for secure communication to first and second devices. The providing apparatus includes a receiving unit that receives a first parameter used by the first device for the secure communication and a second parameter used by the second device for the secure communication from a connection apparatus via which the first device is connected to the second device, a generating unit that generates the information required for the secure communication based on the parameters received from the connection apparatus, and a transmitting unit that transmits the information required for the secure communication, generated by the generating unit, to the first and second devices.

14 Claims, 13 Drawing Sheets

FIG. 6

| | 601 | 602 | 603 | 604 | |
|---|---|---|---|---|---|
| | ID | Device | ah_algo | esp_algo | ... |
| 611 | DC101 | Digital Camera | hmac-sha1<br>hmac-md5 | 3des-cbc | |
| 612 | BJ001 | BJ Printer | hmac-sha1<br>hmac-md5 | blowfish-cbc<br>3des-cbc | |

FIG. 9 spdadd<From_addr>[<From_port>]<to_addr>[<To_port>]any-P out ipsec<sec_type>/transport//<sec_level>···;
spdadd<To_addr>[<To_port>]<From_addr>[<From_port>]any-P in ipsec<sec_type>/transport//<sec_level>···;
add<From_addr><To_addr>ah<To_spi>-A<ah_algo><ah_key>;
add<From_addr><To_addr>esp<To_spi>-E<esp_algo><esp_key>;
add<To_addr><From_addr>ah<From_spi>-A<ah_algo><ah_key>;
add<To_addr><From_addr>esp<From_spi>-E<esp_algo><esp_key>;

FIG. 10

<ipsec-data>
spdadd 2002:200::1[46127]3ffe:514::1[80]any-P out ipsec esp/transport//require ah/transport//require;
spdadd 3ffe:514::1[80]2002:200::1[46127]any-P in ipsec esp/transport//require ah/transport//require;
add 2002:200::1 3ffe:514::1 ah 0x44c-A hmac-sha1 0x94ace39e5fc7372be03b4a3bf232056a2630ce47;
add 2002:200::1 3ffe:514::1 esp 0x44d-E 3des-cbc 0x2630ce4744950e8e117e3f22cdd5defc94ace39e5fc7372b;
add 3ffe:514::1 2002:200::1 ah 0x834-A hmac-sha1 0x94ace39e5fc7372be03b4a3bf232056a2630ce47;
add 3ffe:514::1 2002:200::1 esp 0x835-E 3des-cbc 0x2630ce4744950e8e117e3f22cdd5defc94ace39e5fc7372b;
</ipsec-data>

PROVIDING APPARATUS, COMMUNICATION DEVICE, METHOD, AND PROGRAM

BACKGROUND OF THE INVENTION

1. Field of the Invention

The present invention relates to a providing apparatus, a providing program, and a providing method that provide information required for secure communication to first and second devices, and to a communication device, a program, and a method that receive information required to ensure secure communication with the communication partner from the providing apparatus.

2. Description of the Related Art

Security architecture for Internet protocol (IPsec) is a standardized technology having enough functions and safety to ensure the security in a general Internet protocol (IP) layer. The core of the IPsec is automatic generation of a security association (SA) conforming to an Internet key exchange (IKE) protocol defined in RFC2409 "The Internet key exchange (IKE)". The SA is established in two phases; Phase1 (or Internet security association and key management protocol (ISAKMP) SA) and Phase2 (or IPsec SA). The IPsec is disclosed in, for example, USP No. 2001042201.

In the Phase1, in an aggressive mode, an encryption algorithm for an IKE communication channel is selected in the first round-trip, key (key for IKE communication) exchange is performed in a Diffie-Hellman (DH) key exchange algorithm in the second round-trip, and the communication partner is authenticated in the third round-trip. In the Phase2, encryption algorithms or secret keys used in the encapsulating security payload (ESP) or the authentication header (AH) of a security protocol are exchanged using the secret communication channel established in the first round-trip in Phase1 to transmit the subsequent connection acknowledgement only as transmission. The setting information exchanged in the above manner is registered as SA entries in security association databases (SAD) of the corresponding terminal devices and is utilized in secure communications between the terminal devices.

The IPsec communication is standardized in order to be automatically set between the corresponding terminal devices. However, some pre-settings are required.

Authentication by a pre-shared key method is generally supported as the authentication performed in the third round-trip in Phase1. In the pre-shared key method, it is presumed that a shared key, which is effective only between the two terminal devices performing the secure communication, is directly set for the corresponding devices by a skilled manager. Accordingly, although the pre-shared key method is operational between a few specified devices, it is difficult to operate the pre-shared key method between an unspecified number of devices.

For example, the DH key exchange algorithm and a public key encryption algorithm used in the IPsec are complicated and it takes a few seconds or more to process the IPsec in a mobile terminal or the like, which has a relatively little CPU power. Hence, in devices with relatively little CPU power, it is necessary to use a dedicated arithmetic chip, which creates implementation problems.

SUMMARY OF THE INVENTION

It is desirable to provide a providing apparatus, a providing program, a providing method, a communication device, a method, and a program, in which secure communication can be simply ensured.

The present invention provides a providing apparatus and a providing program that receive a first parameter used by a first device for the secure communication and a second parameter used by a second device for the secure communication from a connection apparatus via which the first device is connected to the second device, that generate the information required for the secure communication based on the parameters received from the connection apparatus, and that transmit the generated information required for the secure communication to the first and second devices.

The present invention provides a providing method in which a connection apparatus, via which a first device is connected to a second device, receives a first parameter used by the first device for the secure communication from the first device and transfers the received first parameter to a providing apparatus, the connection apparatus receives a second parameter used by the second device for the secure communication from the second device and transfers the received second parameter to the providing apparatus, and the providing apparatus generates the information required for secure communication based on the parameters received from the connection apparatus and transmits the generated information to the first and second devices.

The present invention provides a communication device and a program that transmit a parameter required to ensure the secure communication to a connection apparatus via which the connection with a communication partner is established, that receive the information required to ensure the secure communication from a providing apparatus, and that ensure the secure communication with the communication partner based on the information received from the providing apparatus.

The present invention provides a method in which first and second communication devices transmit parameters required to ensure the secure communication to a connection apparatus via which the connection with a communication partner is established, the connection apparatus transfers the parameters required to ensure the secure communication to a providing apparatus, and the first and second communication devices receive the information required to ensure the secure communication from the providing apparatus to ensure the secure communication with the communication partner based on the received information.

Further features and advantages of the present invention will become apparent from the following description of exemplary embodiments with reference to the attached drawings.

BRIEF DESCRIPTION OF THE DRAWINGS

FIG. 6 shows an example of a device database.

FIG. 9 shows an example of an IPsec setting template.

FIG. 10 shows examples of IPsec settings.

DESCRIPTION OF THE EMBODIMENTS

Embodiments of the present invention will be described below with reference to the attached drawings.

Figure 1:
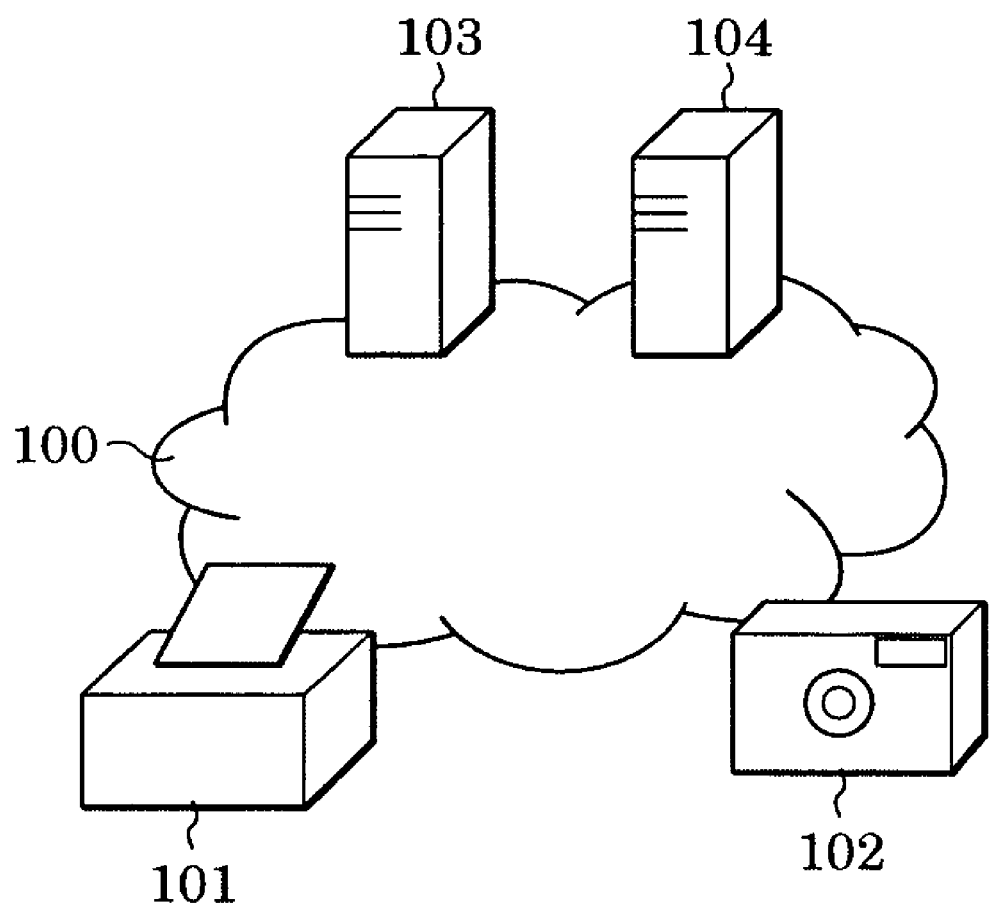
FIG. 1 illustrates the structure of a network according to an embodiment of the present invention.

FIG. 1 illustrates the structure of a network according to an embodiment of the present invention. Referring to FIG. 1, communication using an Internet protocol version 6 (IPv6) can be performed over the Internet 100. A printer 101 is directly or indirectly connected to the Internet 100 and performs the communication using the IPv6 over the Internet 100. A digital camera 102 is directly or indirectly connected to the Internet 100 and performs the communication using the IPv6 over the Internet 100.

A session initiation protocol (SIP) server 103 is connected the Internet 100 and establishes a session for peer-to-peer communication using the IPv6 between the printer 101 and the digital camera 102. Specifically, in the peer-to-peer communication between the printer 101 and the digital camera 102, the printer 101 and the digital camera 102 perform address registration (SIP Register) for the SIP server 103, and the digital camera 102 transmits a session request (SIP Invite) to the printer 101 through the SIP server 103 to establish a session for the peer-to-peer communication between the printer 101 and the digital camera 102. After the session is established, the peer-to-peer communication can be performed between the printer 101 and the digital camera 102 using an appropriate application. The SIP is defined in RFC2543.

A security management server 104, which is connected to the Internet 100, manages the security in the peer-to-peer communication over the Internet 100 between the printer 101 and the digital camera 102. The security management server 104 has detailed information concerning the printer 101 and the digital camera 102. The security is ensured in the communications between the security management server 104 and the printer 101 and between the security management server 104 and the digital camera 102 over the Internet 100. Specifically, the security management server 104 and the printer 101 are provided with common authentication and encryption keys against leakage of the information. The security management server 104 and the printer 101 perform authentication associated with the communication and encryption of the content of the communication based on the information concerning the authentication and encryption keys. The security management server 104 also serves as an SIP user agent (UA) for the SIP server 103.

In the structure of the network in FIG. 1, information required for secure communication is supplied from the security management server 104, which is an example of a providing apparatus, to the digital camera 102 and the printer 101, which are an example of a first device and an example of a second device, respectively.

The SIP server 103, which is an example of a connection apparatus via which the printer 101 is connected to the digital camera 102, receives parameter used by the digital camera 102 for the secure communication from the digital camera 102 and transmits the received parameter to the security management server 104. The SIP server 103 receives parameters used by the printer 101 for the secure communication from the printer 101 and transmits the received parameter to the security management server 104. Levels of the security (the security is essential, etc.) and types of the security (authentication and encryption) are specified as the parameters for the secure communication.

The security management server 104 generates the information required for the secure communication based on the parameters received from the SIP server 103 and transmits the generated information to the digital camera 102 and the printer 101. The information required for the secure communication includes the keys for the secure communication.

Figure 2:
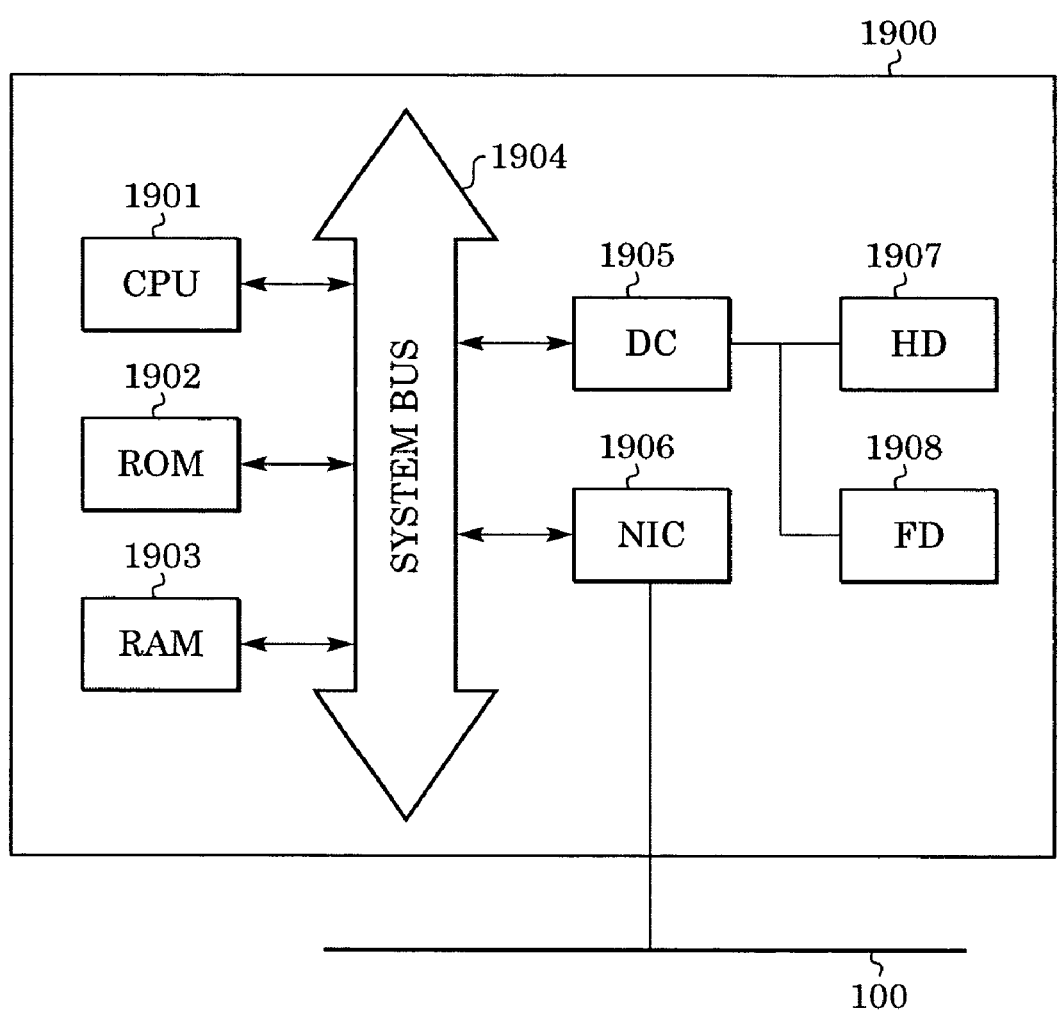
FIG. 2 shows an example of the hardware structure in which a software program for realizing the functions according to this embodiment is executed.

FIG. 2 shows an example of the hardware structure in which a software program for realizing the functions according to this embodiment is executed. Although an example of the hardware structure in which a computer 1900 is the security management server 104 is shown in FIG. 2, the SIP server 103 has the same structure as in FIG. 2. The printer 101 and the digital camera 102 can have the same structure as in FIG. 2 with a printing unit and an imaging unit being added, respectively.

The computer 1900 includes a central processing unit (CPU) 1901, a read only memory (ROM) 1902, a random access memory (RAM) 1903, a disk controller (DC) 1905 for controlling a hard disk (HD) 1907 and a floppy disk (FD) 1908, and a network interface card (NIC) 1906, which are connected to each other via a system bus 1904 so as to communicate with each other. The system bus 1904 is connected to the Internet 100 in FIG. 1 via the NIC 1906. The CPU 1901 executes software stored in the ROM 1902 or the HD 1907 or software supplied from the FD 1908 to comprehensively control each component connected to the system bus 1904. In other words, the CPU 1901 controls each component by reading out the processing program, which follows processing sequences described below, from one of storage media ROM 1902, HD 1907, and FD 1908 and executing the readout program in order to realize the operation according to this embodiment. The RAM 1903 functions as a main memory or a work area of the CPU 1901. The DC 1905 controls a boot program, various applications, edit files, user files, a network management program, and access to the HD 1907 and the FD 1908, which store the processing program according to this embodiment. The NIC 1906 performs intercommunication using the IPv6 over the Internet 100.

The security management server 104 is the providing apparatus for providing the information required for the secure communication to the digital camera 102, which is the first device, and to the printer 101, which is the second device. The security management server 104 has the NIC 1906, which is a receiving unit for receiving the parameters used by the digital camera 102 for the secure communication and the parameters used by the printer 101 for the secure communication from the SIP server 103, which is the connection apparatus via which the digital camera 102 is connected to the printer 101. The security management server 104 has the CPU 1901, which is a generating unit for generating the information required for the secure communication based on the parameters received from the SIP server 103. The NIC 1906 is a transmission unit for transmitting the information required for the secure communication, generated by the CPU 1901, to the digital camera 102 and the printer 101.

The digital camera 102 and the printer 101 are examples of communication devices that receive the information required to ensure the secure communication with the communication partner from the security management server 104, which is the providing apparatus. The digital camera 102 and the printer 101 each have the NIC 1906, which is a transmitting unit for transmitting the parameters required for the secure communication to the SIP server 103, which is the connection apparatus connecting to the communication partner. The NIC 1906 in the digital camera 102 and the printer 101 is a receiving unit for receiving the information required for the secure communication from the security management server 104. The digital camera 102 and the printer 101 each have the CPU 1901, which is a security ensuring unit for ensuring the secure communication with the communication partner based on the information received from the security management server 104 by the NIC 1906.

The SIP server 103 has a location database in the RAM 1903 or the HD 1907. The location database stores the SIP uniform resource identifiers (URIs) and the IPv6 addresses of each terminal connected to the Internet 100 and the security management server 104. The SIP URIs of the printer 101, the digital camera 102, and the security management server 104 are, for example, BJ001@device.oanon.com, DC101@device.oanon.com, and SS900@device.oanon.com, respectively. The IPv6 addresses of the printer 101, the digital camera 102, and the security management server 104 are, for example, 3ffe:514::1, 2002:200::1, and 2001:340::1, respectively.

A flow in which the information described above is registered in the location database in the SIP server 103 will now be briefly described. The SIP server 103 provides a registry service, a location service, and a proxy service as the SIP server of a "device.oanon.com" domain. The printer 101 registers (SIP Register) the IPv6 address (3ffe:514::)1), which is automatically set upon connection to the Internet 100, in the SIP server 103 along with the self device ID (BJ001).

The SIP server 103, which has received the registration request, performs authentication defined in the SIP to accept the registration of the printer 101. The device ID (BJ001) is connected to the domain (device.oanon.com), managed by the SIP server 103, with "@" being sandwiched therebetween to provide the SIP URI of the device. The IPv6 address (3ffe:514::19) is extracted from the registration request message (SIP Register message) supplied from the printer 101, and the extracted IPv6 address is stored in the location database along with the created SIP URI (BJ001@device.oanon.com).

Figure 3:
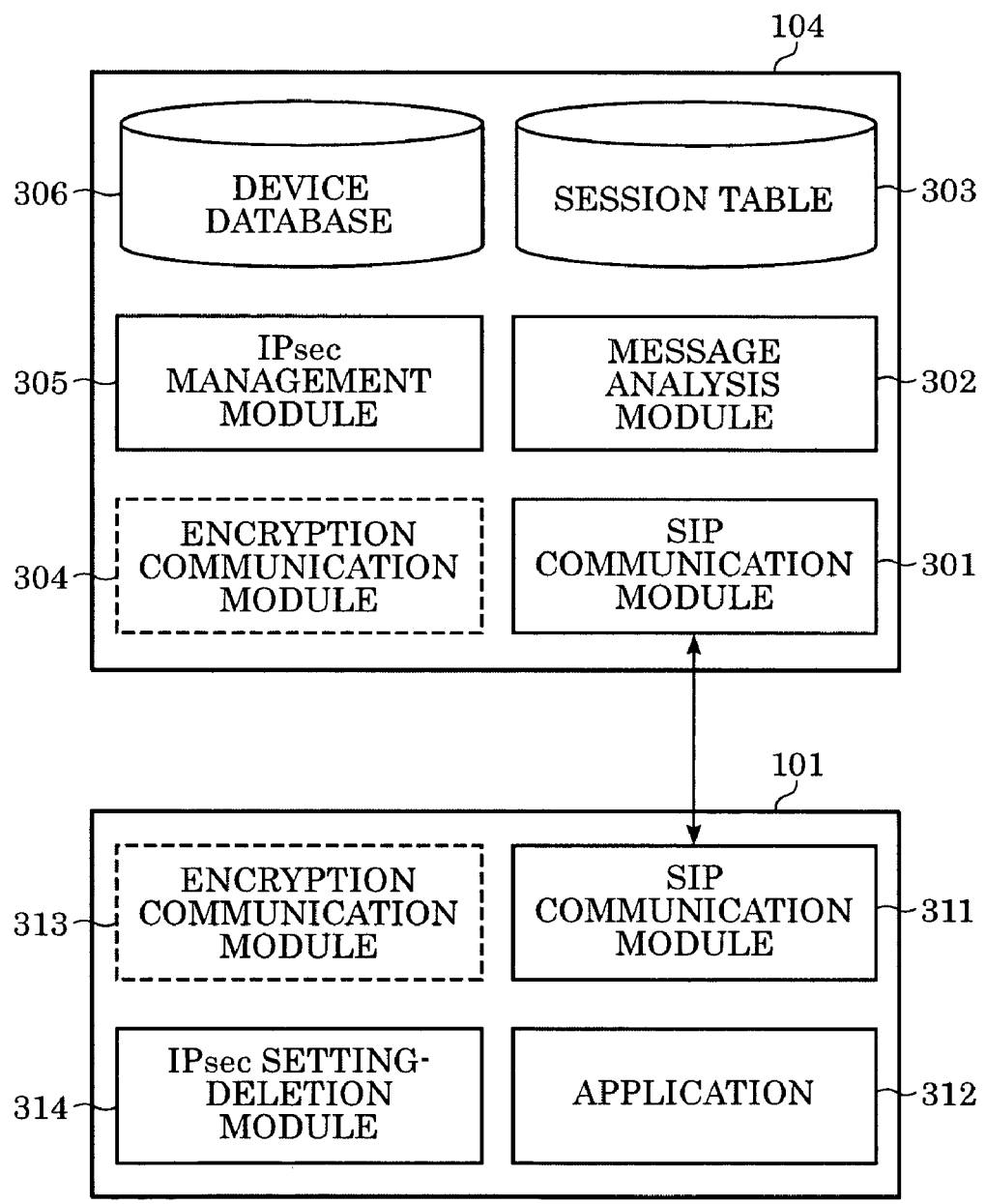
FIG. 3 shows the structures of modules in a printer and a security management server.

FIG. 3 shows the structures of modules in the printer 101 and the security management server 104. The security management server 104 has modules 301 to 306 and the printer 101 has modules 311 to 314. The digital camera 102 has the same structure of modules as the printer 101.

A SIP communication module 301 is used to transmit and receive an SIP message to and from the SIP server 103. A message analysis module 302 analyzes the SIP message transmitted and received by the SIP communication module 301. A session table 303 manages and stores the information concerning a session established between the devices. The information concerning the session is obtained by message analysis of the establishment or deletion of the session in the message analysis module 302. The session table 303 will be described in detail below with reference to FIG. 5.

An encryption communication module 304 is used to transmit and receive messages to and from the printer 101 through a secure communication channel that is set in advance. An IPsec management module 305 is used to create IPsec settings used in the printer 101 from the information in the session table 303 and a device database 306 described below. The device database 306 stores information that is specific to the device and that is used in the creation of the IPsec. The device database 306 will be described in detail below with reference to FIG. 6. The session table 303 and the device database 306 are provided in the RAM 1903 or the HD 1907.

A SIP communication module 311 is a communication processing module of SIP messages in the printer 101. The SIP communication module 311 is equivalent to the SIP communication module 301. An application 312 is used in peer-to-peer communication between the printer 101 and another device (for example, digital camera 102). An encryption communication module 313 is used to transmit and receive messages to and from the security management server 104 through a secure communication channel that is set in advance. The encryption communication module 313 is equivalent to the encryption communication module 304. An IPsec setting-deletion module 314 sets the IPsec settings created in the IPsec management module 305 in the printer 101.

Figure 4:
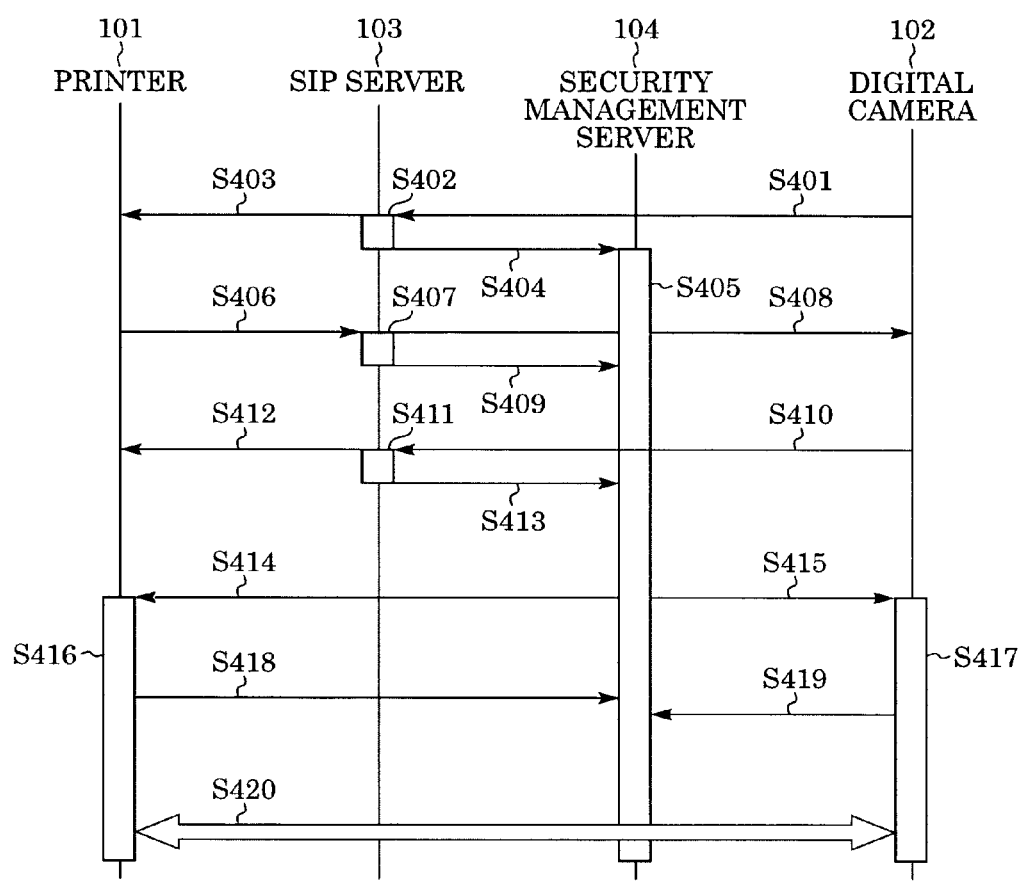
FIG. 4 is a sequence diagram according to an embodiment of the present invention.

FIG. 4 is a sequence diagram according to an embodiment of the present invention. This sequence shows a process of performing peer-to-peer communication from the digital camera 102 to the printer 101. It is presumed that the registration process (SIP Register) for the SIP communication has been already completed in this sequence. FIG. 4 shows a providing method in which the security management server 104, which is a providing apparatus, provides the information required for the secure communication to the digital camera 102, which is the first device, and to the printer 101, which is the second device. FIG. 4 also shows a method of receiving the information required to ensure the secure communication between the digital camera 102 and the printer 101 from the security management server 104.

In Step S401, the digital camera 102 transmits an Invite request message to request the establishment of a session to the SIP server 103. The Invite request message includes the SIP URI (BJ001@device.oanon.com) of the printer 101 to which the Invite request is submitted. In the Invite request message, address information and application information (port number) in the peer-to-peer communication between the digital camera 102 and the printer 101 and security information required for secure peer-to-peer communication are described in a session description protocol (SDP) and attached. The SDP will be described in detail below.

In Step S402, the SIP server 103 receives the Invite request message transmitted in Step S401. In Step S403, the SIP server 103 searches the location database described above for an IPv6 address based on the SIP URI (BJ001@device.oanon.com) of the printer 101 to which the Invite request is submitted, and transfers the Invite request message in Step S401 to the printer 101 without change. In Step S404, the SIP server 103 also transfers the Invite request message in Step S401 to the security management server 104 without change. This transfer is realized, for example, by using a fork function defined in the SIP. The IPv6 address of the security management server 104 is also registered in the location database. In other words, the SIP server 103 changes the destination of the Invite request message, which is transmitted from the digital camera 102 to the SIP server 103, to the printer 101 and the security management server 104 and, in Steps S403 and 404, transmits the Invite request message to the printer 101 and the security management server 104, respectively.

The Invite request message for the establishment of a session is subsequently transferred to the security management server 104 by using the SIP fork function. In Step S405, the security management server 104 collects the session information concerning the digital camera 102 and the printer 101. The session information is registered in the session table 303.

In Step S406, the printer 101 transmits a response message to the digital camera 102 through the SIP server 103 in response to the Invite request message received in Step S403. A "200OK" allowing the reception of a session (hereinafter referred to as a 200OK message) is returned as the response message in Step S406. The 200OK message includes the SDP describing a variety of information required for the peer-to-peer communication with the digital camera 102. An error message may also be returned as the response message. The error message will be described below with reference to FIG. 7.

In Step S407, the SIP server 103 searches for an IPv6 address based on the destination SIP URI, as in Step S402. In Step S408, the SIP server 103 transfers the 200OK message in Step S406 to the digital camera 102 without change. In Step S409, the SIP server 103 also transfers the 200OK message in Step S406 to the security management server 104 by using the SIP fork function described above. In Step S410, the digital camera 102, which has received the 200OK message in response to the Invite request, transmits an Ack message indicating the reception of the 200OK message to the printer 101 through the SIP server 103. In Step S411, the SIP server 103 searches for an IPv6 address based on the destination SIP URI, as in Steps 402 and 407. In Step S412, the SIP server 103 transfers the Ack message in Step S410 to the printer 101. In Step S413, the SIP server 103 also transfers the Ack message to the security management server 104. The transfer of the SIP messages described above establishes a session for the peer-to-peer communication between the digital camera 102 and the printer 101 using the SIP.

Since all the session information concerning the digital camera 102 and the printer 101 is collected in the security management server 104 in Step S405, IPsec settings to be set for the digital camera 102 and the printer 101 depending on the security level of the peer-to-peer communication between the digital camera 102 and the printer 101 are created from the collected session information. In Steps S414 and S415, the security management server 104 transmits the IPsec settings to the printer 101 and to the digital camera 102, respectively. In the transmission of the IPsec settings in Steps S414 and S415, the content of the communication is encrypted in the encryption communication modules 304 and is transmitted to the printer 101 and the digital camera 102. The encryption allows key information for the peer-to-peer communication, included in the IPsec settings, to be securely provided to both the devices (the digital camera 102 and the printer 101).

In Steps S416 and S417, the printer 101 and the digital camera 102 set therein the IPsec settings received from the security management server 104. Specifically, the received IPsec settings are input in the kernel with a setkey command by the respective IPsec setting-deletion module 314 to set the IPsec settings in the printer 101 and the digital camera 102. In Steps S418 and S419, the printer 101 and the digital camera 102 indicate to the security management server 104 whether the IPsec settings are successfully set or if an error occurs. Indicating to the security management server 104 whether the IPsec settings are successfully set allows the security management server 104 to perform the management of the session information concurrently with the management of the IPsec communication. If the IPsec settings are successfully set in both the devices (the printer 101 and the digital camera 102), in Step S420, the application 312 in each of the devices is started up and the peer-to-peer communication using the IPsec is established between the digital camera 102 and the printer 101.

The following is an example of the SDP attached to an SIP Invite-related message. The example shows the content of the SDP which the printer 101 attaches to the 200OK message.

v=0
o=BJ001 2451851 1121443870 IN IP6 3ffe:514::1
s=–
c=IN IP6 3ffe:514::1
t=0 0
m=application 80 HTTP
k=ipsec_level:require
k=ipsec_type:ah&esp
k=ipsec_spi:0x44c "BJ001" in the second line denotes the device ID of the printer 101 and "3ffe:514::1" in the second line denotes the IPv6 address of the printer 101. The IPv6 address of the printer 101 is also described in the fourth line. "80" in the sixth line denotes the port number of the application and "HTTP" in the sixth line denotes the protocol to be used. The security level sec_level, the security type sec_type, and the security parameter index (SPI) number are described in the seventh to ninth lines.

The security level sec_level has three values: use (use of the IPsec is not essential); require (use of the IPsec is essential); and unique (the SA used in the IPsec is uniquely specified). The security type sec_type has three values: ah (authentication); esp (encryption); and ah&esp (authentication and encryption). The security type indicates a protocol (ah, esp, or both of them) used to ensure the secure communication. The SDP also includes the value of the SPI in the SA information of the IPsec.

The SDP includes parameters for the secure communication or parameters required to ensure the secure communication. Examples of the parameters are described above.

As described above, referring to FIG. 4, the SIP server 103, which is the connection apparatus via which the digital camera 102 (first device) is connected to the printer 101 (second device), receives the parameters required by the digital camera 102 for the secure communication, included in the SDP attached to the Invite request message in Step S401, from the digital camera 102 and transfers the received parameters to the security management server 104. The SIP server 103 receives the parameters required by the printer 101 for the secure communication, included in the SDP attached to the response message in Step S406, from the printer 101 and transfers the received parameters to the security management server 104. The digital camera 102 transmits the request to communicate with the printer 101 to the SIP server 103. This request includes the identification information concerning the printer 101. The SIP server 103 converts the identification information concerning the printer 101 into the IP address and transfers the request from the digital camera 102 to the printer 101. The SIP server 103 also transfers the request from the digital camera 102 to the security management server 104. The printer 101 returns the response (200OK message), in Step S406, in response to the request to the digital camera 102 through the SIP server 103. The digital camera 102 returns the response (Ack message), in Step S410, to the printer 101 through the SIP server 103. The parameters required by the digital camera 102 for the secure communication are included in the request (Step S401) or the response (Ack message) (Step S410), and the parameters required by the printer 101 for the secure communication are included in the response (200OK message) (Step S406).

The security management server 104 generates the information (IPsec settings) required for the secure communication based on the parameters received from the SIP server 103 and transmits the generated information to the printer 101 and the digital camera 102 in Steps S414 and S415, respectively.

The digital camera 102 and the printer 101 transmit the parameters, included in the SDP attached to the Invite request message in Step S401 or the response in Step S406, required to ensure the secure communication to the SIP server 103, via which the connection is established with the communication partner. The SIP server 103 transfers the parameters required to ensure the secure communication to the security management server 104. The digital camera 102 and the printer 101 receive the information (IPsec settings) required to ensure the secure communication from the security management server 104 and ensure the secure communication with the communication partner based on the received information.

The CPU 1901 in the digital camera 102 and the printer 101 performs the operation described above in accordance with a program stored in the ROM 1902 or the HD 1907. The program is used for receiving the information required to ensure the secure communication with the communication partner from the providing apparatus. The program is used for transmitting the parameters required to ensure the secure communication to the connection apparatus, via which the connection is established with the communication partner, and for receiving the information required to ensure the secure communication from the providing apparatus. The program is used for ensuring the secure communication with the communication partner based on the information required to ensure the secure communication, received from the providing apparatus.

Figure 5:
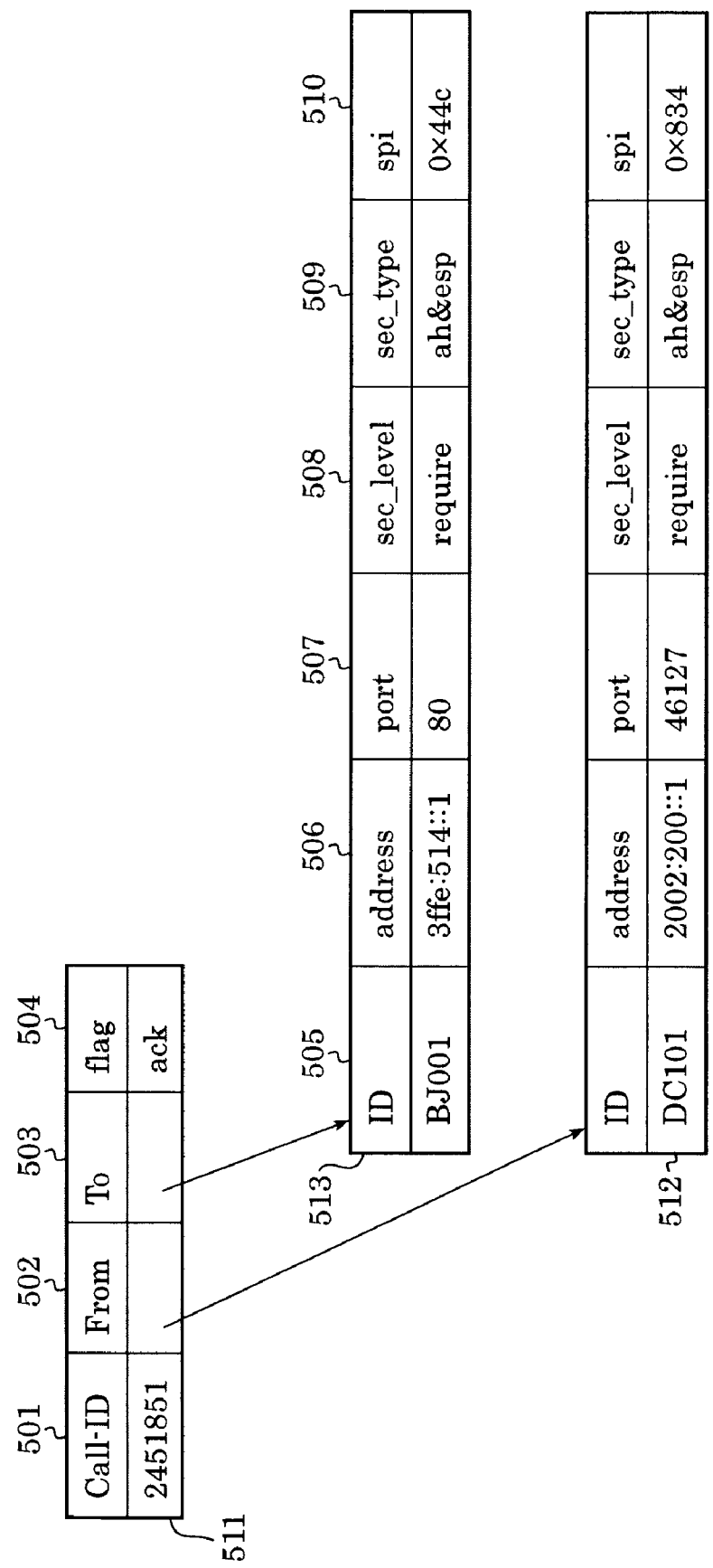
FIG. 5 shows an example of a session table.

FIG. 5 shows an example of the session table 303 in FIG. 3. One entry 511 in the session table 303 includes information 512 concerning the digital camera 102 and information 513 concerning the printer 101. The session ID is a unique ID in the SIP messages, from the Invite request message in Step S401 to the Ack message in Step S413 described above, and is stored in Call-ID 501. The session ID is an identifier of the session established between the digital camera 102 and the printer 101.

The information concerning the Invite request submitting side (the digital camera 102) is stored in From 502. The information concerning the Invite request receiving side (the printer 101) is stored in To 503. The information stored in the From 502 and the To 503 is unique in the SIP messages, from the Invite request message in Step S401 to the Ack message in Step S413 described above. The state of the session table 303 is stored in flag 504. An Ack flag indicating that the Ack message transferred at the end of the process of establishing a session is acquired or a delete flag indicating an error during the process of establishing a session or the completion of a process of terminating a session is set in the flag 504.

The information 512 and 513 (505 to 510) denote the information in the From 502 and the To 503 in detail. The information in 505 to 510 is acquired from the SDP information attached to the SIP message transferred between the digital camera 102 and the printer 101 in the process of establishing a session. The ID specific to each of the devices is stored in ID 505. The device ID is described on the left side of "@" in the SIP URI according to this embodiment (that is, the device ID of the printer 101 is "BJ001" because the printer 101 has the SIP URI "BJ001@device.oanon.com"). The IPv6 address used upon establishment of the session is stored in address 506 and is acquired from the information described in the SDP. The port number of the application, used for the communication in the established session, is stored in port 507 and is also acquired from the information described in the SDP.

The security level of the peer-to-peer communication between the digital camera 102 and the printer 101 is stored in sec_level 508 and is also acquired from the information described in the SDP. The security level has the three values: use (use of the IPsec is not essential); require (use of the IPsec is essential); and unique (the SA used in the IPsec is uniquely specified). The security type of the peer-to-peer communication between the digital camera 102 and the printer 101 is stored in sec_type 509 and is also acquired from the information described in the SDP. The security type has the three values: ah (authentication); esp (encryption); and ah&esp (authentication and encryption). The security type shows the protocol (ah, esp, or both of them) used to ensure the secure communication. The value of the SPI in the SA information of the IPsec built between the digital camera 102 and the printer 101 is stored in spi 510 and is also acquired from the information described in the SDP.

FIG. 6 shows an example of the device database 306. The ID unique to the individual device is stored in ID 601. The type of the individual device is stored in Device 602. The ah (authentication) algorithm of the individual device is stored in ah_algo 603. The esp (encryption) algorithm of the individual device is stored in esp_algo 604. Reference numerals 611 and 612 denote the device information concerning the digital camera 102 and the printer 101, respectively. The information concerning the authentication and encryption keys shared between the security management server 104 and each device may be stored as the entry items in the device database 306. Such information has been registered in the device database 306 in advance. Alternatively, such information may be transmitted from each device to the security management server 104 in the SDP or along with the SDP and may be registered in the device database 306.

Figure 7:
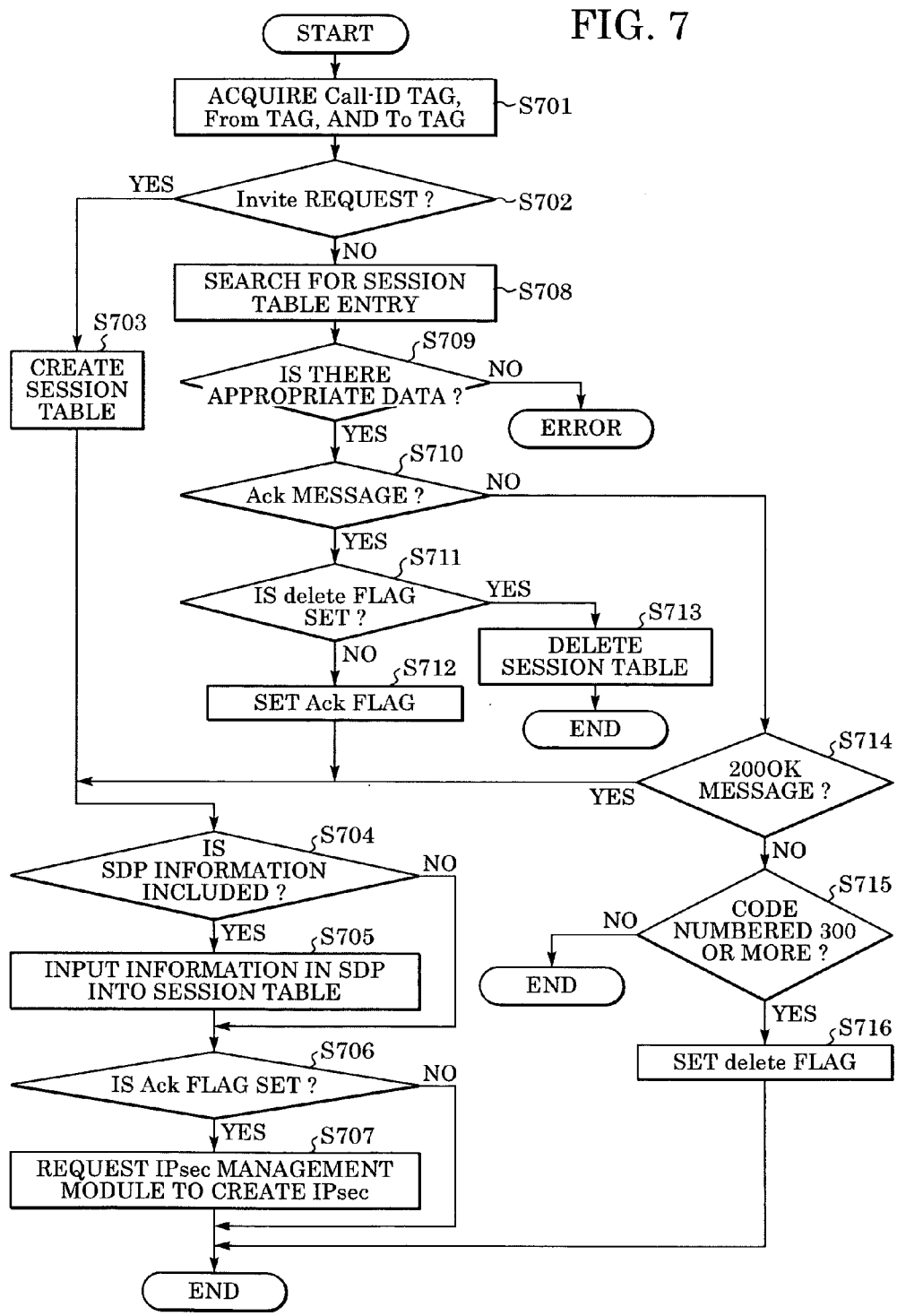
FIG. 7 is a flowchart showing a process performed in a message analysis module.

FIG. 7 is a flowchart showing a process performed in the message analysis module 302 in Step S405 described above. Particularly, a process of creating an entry in the session table 303 from the SIP Invite-related message (the Invite request message, the 200OK message, the Ack message, or an error message in response to the Invite request), transferred in the process of establishing a session from the digital camera 102 to the printer 101, will be described.

In Step S701, the process acquires the information concerning the Call-ID tag, the From tag, and the To tag from the SIP Invite-related message. The use of the information concerning the Call-ID tag as the session ID can uniquely identify the session to be established. In addition, the information concerning the From tag and the To tag can be used to uniquely identify the two devices (the digital camera 102 and the printer 101) between which the session is to be established. In Step S702, the process determines whether the received SIP Invite-related message is an Invite request message in Step S404. That is, the process determines the first message in the process of establishing the session. If the Invite request message is received, the process proceeds to Step 703. If a message (the 200OK message, the Ack message, or an error message) other than the Invite request message is received, the process proceeds to Step S708.

Since it is determined that the two devices that are to establish a new session exist if the Invite request message is received, in Step S703, the process creates a new entry in the session table 303. The entry items input here include, for example, the Call-ID, the device ID in the From tag, and the device ID in the To tag. In Step S704, the process determines whether SDP information is included in the received SIP Invite-related message. If the SDP information is included in the Invite request message, the process proceeds to Step S705. If the SDP information is not included in the Invite request message, the process proceeds to Step S706. Although the SDP is often attached to the Invite request message, the determination in Step S704 is performed because the SIP can not specify the SDP information.

In Step S705, the process acquires the information concerning the corresponding device (the device described in the From tag or the To tag) from the SDP information included in the SIP Invite-related message and inputs the acquired information into the corresponding entry items in the session table 303. The determination of the device is based on the device ID included in the SDP and the device ID registered in the session table 303 to acquire the information concerning the entry items to be described in the address 506, the port 507 (the port number of the application), the sec_level 508, the sec_type 509, and the spi 510 in the session table 303 from the SDP and to input the acquired information in the corresponding entry items. In Step S706, the process checks the flag item in the session table 303 to determine whether the Ack flag is set. If the Ack flag is set, the process proceeds to Step S707. If the Ack flag is not set, the process is terminated and goes back to Step S701 to process the subsequent SIP Invite-related message. When the Invite request message in Step S404 is received, the process is terminated here.

A flow in the case of receiving the 200OK message in Step S409 will now be described. When the 200OK message is received, the process proceeds to Step S708 as a result of the determination in Step S702 after the process acquires the information concerning the Call-ID tag, the From tag, and the To tag in Step S701. In Step S708, the process searches the session table 303 based on the information concerning the Call-ID tag, the From tag, and the To tag, acquired in Step S701, to acquire the corresponding entry. In Step S709, the process determines whether the corresponding data exist. If the corresponding data does not exist in the session table 303, an error occurs. If the corresponding data exist in the session table 303, the process proceeds to Step S710 to determine whether the SIP Invite-related message is the Ack message. If the SIP Invite-related message is the Ack message, the process proceeds to Step S711. If the SIP Invite-related message is a message (the 200OK message, an error message, etc.) other than the Ack message, the process proceeds to Step S714.

If the determined type is the 200OK message in Step S710, then in Step S714, the process further determines whether the SIP Invite-related message is the 200OK message. If the SIP Invite-related message is the 200OK message, the process proceeds to Step S704. If the SIP Invite-related message is a message (for example, an error message) other than the 200OK message, the process proceeds to Step S715. In the processing of the 200OK message, the process determines whether the SDP information is included in Step S704, acquires the SDP information in Step S705, determines whether the Ack flag is set in Step S706, and then terminates. Since the SDP information is included in the 200OK message, the processing described above is performed in Step S704 and the subsequent steps.

A flow in the case of receiving an error message will now be described. When the printer 101, which has received the Invite request message, cannot establish a session, an error message is transmitted. For example, when the printer 101 is establishing a session with another device and, therefore, cannot establish a session with the digital camera 102 or when a function that the printer 101 does not support is requested in the SDP information transmitted from the digital camera 102, an error message is transmitted instead of the 200OK message. If the message analysis module 302 receives an error message, Steps S701, S702, S708, S709, S710, and S714 are performed and, then in Step S715, the process determines the type of the SIP Invite-related message.

In the SIP, codes similar to those in an HTTP protocol are returned as the message in response to a request message. Codes numbered 200 through 299 indicate success and codes numbered 300 or more indicate, for example, errors or redirect. Response codes numbered 100 through 199 are used during calling of the communication partner (the printer 101 here) or to indicate that messages are received. In Step S715, the process determines whether the SIP Invite-related message is a message having any code numbered 100 through 199 or an error message. If an error message is received, the process proceeds to Step S716. In Step S716, the process sets a delete flag to delete the entry registered in the session table 303, and then terminates.

Finally, a flow in the case of receiving the Ack message will now be described. The Ack message is transferred as the third SIP Invite-related message after the 200OK message or an error message. When the Ack message is received, Steps S701, S702, S708, S709, and S710 are performed and, then in Step S711, the process determines whether the delete flag is set. If the delete flag is set, the process proceeds to Step S713. If the delete flag is not set, the process proceeds to Step S712. Since the delete flag has been set in Step S716 when an error message is processed immediately before the Ack message, in Step S713, the process deletes the corresponding entry in the session table 303, and then terminates. This corresponds to a case in which a session cannot be established between the two devices.

When the 200OK message is processed immediately before the Ack message, in Step S712, the process sets the Ack flag. This means that a session has been established between the two devices. Then in Step S704, the process determines whether the SDP information is included in the received SIP Invite-related message. Although the SDP information is often not included in the Ack message in the general SIP Invite processing, there is a case in which the SDP information is included. If the SDP information is included in the SIP Invite-related message, in Step S705, the process acquires the SDP information and inputs the acquired information into the corresponding entry in the session table 303. After the determination of the message is performed in Step S706, regardless of the existence of the SDP information, the process proceeds to Step S707. In Step S707, the process requests the IPsec management module 305 to generate the IPsec settings along with the entry data in the completed session table 303. The processing in the IPsec management module 305 will be described in detail with reference to FIGS. 8A and 8B.

Figure 8A:
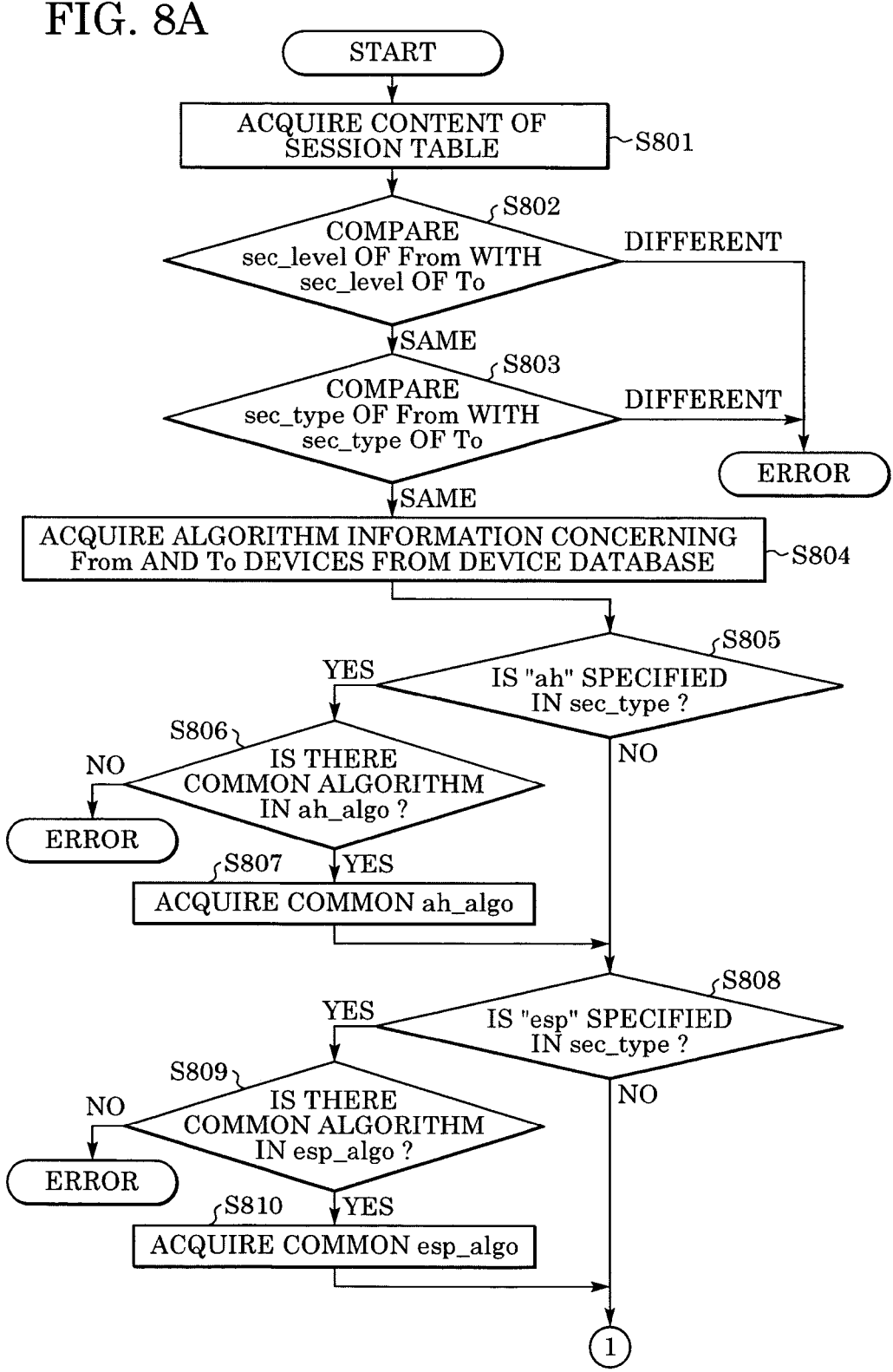
FIGS. 8A and 8B are flowcharts showing a process performed in an IPsec management module.
Figure 8B:
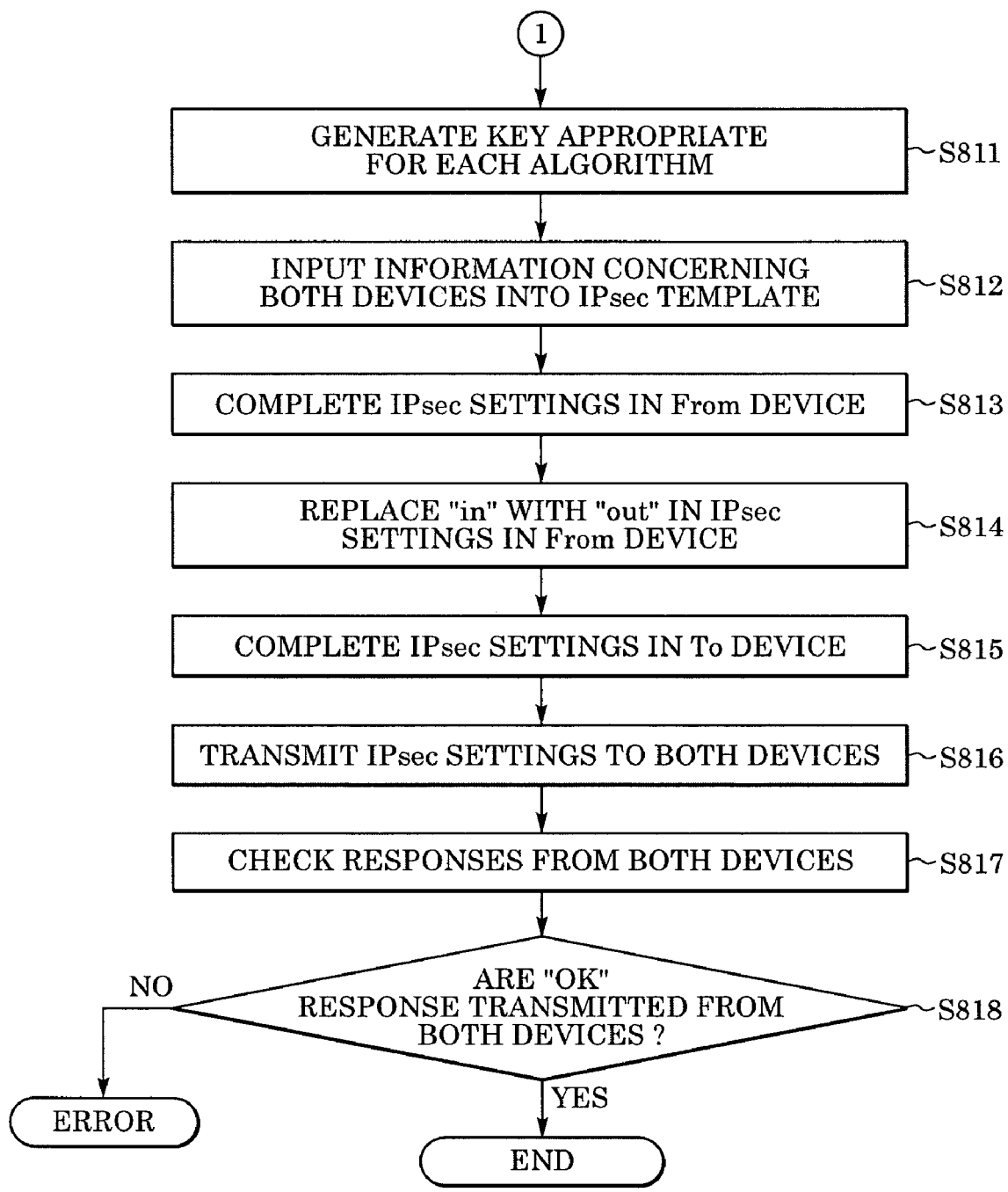

FIGS. 8A and 8B are flowcharts showing a process performed in the IPsec management module 305 in Step S405 described above. Particularly, a process of creating the IPsec settings for the peer-to-peer communication for the digital camera 102 and the printer 101 in response to the request to generate the IPsec settings in Step S707 is described.

In Step S801, the IPsec management module 305, which has received the request to generate the IPsec settings, acquires the content of the specified entry from the session table 303. In Step S802, the process compares the sec_level item in the information concerning the digital camera 102 at the From side with that in the information concerning the printer 101 at the To side and, in Step S803, compares the sec_type item in the information concerning the digital camera 102 at the From side with that in the information concerning the printer 101 at the To side, based on the information acquired from the session table 303. The information of the sec_level item and the sec_type item concerning the digital camera 102 coincides with the information thereof concerning the printer 101 in negotiations because the digital camera 102 and the printer 101 notify self information using the SDP and establish the communication therebetween in a common security policy in the SIP Invite processing. If the information concerning the digital camera 102 is different from the information concerning the printer 101, an error occurs. If the information concerning the digital camera 102 coincides with the information concerning the printer 101, the process proceeds to Step S804. In Step S804, the process acquires the information concerning the devices (the digital camera 102 and the printer 101) specified as the From side and the To side from the device database 306.

In Step S805, the process checks the sec_type item in the session table 303 to determine whether use of the ah (authentication) is specified. If the use of the ah is specified, the process proceeds to Step S806. If the use of the ah is not specified, the process proceeds to Step S808. In Step S806, the process compares the ah_algo item in the information concerning the digital camera 102 with that in the information concerning the printer 101 to determine whether a common authentication algorithm exists. If an authentication algorithm common to both the devices (the digital camera 102 and the printer 101) exists, the process proceeds to Step S807. If a common authentication algorithm does not exist, an error occurs. In Step S807, the process acquires the identifier of an authentication algorithm common to both the devices.

In Step S808, the process checks the sec_type item in the session table 303 to determine whether use of the esp (encryption) is specified. If the use of the esp is specified, the process proceeds to Step S809. If the use of the esp is not specified, the process proceeds to Step S811. In Step S809, the process compares the esp_algo item in the information concerning the digital camera 102 with that in the information concerning the printer 101 to determine whether a common encryption algorithm exists. If an encryption algorithm common to both the devices (the digital camera 102 and the printer 101) exists, the process proceeds to Step S810. If a common encryption algorithm does not exist, an error occurs. In Step S810, the process acquires the identifier of an encryption algorithm common to both the devices.

In Step S811, the process generates keys appropriate for the authentication algorithm and the encryption algorithm based on the information concerning the authentication algorithm and the encryption algorithm, acquired in Step S807 and Step S810, respectively. The keys are generated by using random numbers and the lengths of the keys are adjusted to ones appropriate for the authentication and encryption algorithms. The relationship between the algorithms and the lengths of the keys will be described in detail below. In Step S812, the process inputs appropriate data, including the information in the session table 303, acquired in Step S801, and the information concerning the authentication algorithm, the encryption algorithm, and the keys, acquired in Step S807 and S810 and generated in Step S811, respectively, in an IPsec setting template to create the IPsec settings. The IPsec setting template will be described in detail below with reference to FIG. 9. In Step S813, the process sets the created IPsec settings as the IPsec settings for the device (digital camera 102) at the From side.

In Step S814, the process modifies part of the IPsec settings created in Step S812. Specifically, the description in "in" is replaced with the description in "out", which define the direction of the communication, in the settings for a security policy (SP). In Step S815, the process sets the IPsec settings modified in Step S812 as the IPsec settings for the device (printer 101) at the To side.

In Step S816, the process transmits the IPsec settings (Step S415) of the device at the From side, set in Step S813, and the IPsec settings (Step S414) of the device at the To side, set in Step S815, to the corresponding devices. In this transmission, the content of the transmission is encrypted in the encryption communication module 304 and the encryption communication module 313. The SIP is used for the transmission. In Step S817, the process receives the responses (Step S418 and S419) indicating whether the IPsec settings transmitted to both the devices are correctly set. In Step S818, the process determines whether both the devices return "OK" responses. If both the devices return "OK" responses, the process in response to the request to generate the IPsec settings successfully terminates. Otherwise, an error occurs.

The flows in FIGS. 7 and 8 correspond to the providing program that provides the information required for the secure communication to the digital camera 102, which is the first device, and to the printer 101, which is the second device.

The program receives the parameters used by the digital camera 102 for the secure communication and the parameters used by the printer 101 for the secure communication (the parameters are included in the SDP) from the SIP server 103, which is the connection apparatus via which the digital camera 102 is connected to the printer 101 (Step S705), generates the information for the secure communication based on the parameters received from the SIP server 103 (Step S813), and transmits the generated information required for the secure communication to the digital camera 102 and the printer 101 (Step S816).

The relationship among the authentication algorithm, the encryption algorithm, and the lengths of the keys in Step S811 will now be described. For example, when "hmac-sha1" is selected as the authentication algorithm, a key having a length of 160 bits is generated in Step S811. When "3des-cbc" is selected as the encryption algorithm, a key having a length of 64 bits is generated corresponding to the encryption algorithm. When "hmac-md5" is selected as the authentication algorithm, a key having a length of 128 bits is generated. In an algorithm "blowfish-cbc", a key having any length from 40 bits to 448 bits can be generated. In an algorithm "rijndael-cbc", a key having any length of 128 bits, 192 bits, and 256 bits can be generated.

FIG. 9 shows an example of the IPsec setting template in Step S812. Although the example is described in the format of "setkey" command for setting the IPsec settings, the template is not limited to this format and any format that would enable practice of the present invention is applicable. The first and second lines show the information concerning the SP and the third to sixth lines show the information concerning the SA. The IPsec settings are completed by assigning the information in the session table or the device database, or the information concerning the generated keys in < > items in FIG. 9. The meaning of each item will now be described.

The IPv6 address of the device at the From side is assigned in <From_addr>. The IPv6 address of the device at the To side is assigned in <To_addr>. The port number of the device at the From side is assigned in <From_port>. The port number of the device at the To side is assigned in <To_port>. The qjsec_type common to both the devices is assigned in <sec_type>. The sec_level common to both devices is assigned in <sec_level>. When "ah & esp" is specified in <sec_type>, that is, both the authentication and the encryption are used, "<sec_type>/transport//<sec_level>" is repeatedly set. For example, "~ah/transport//require esp/transport//require~" is described. The SPI of the device at the From side is assigned in <From_spi>. The SPI of the device at the To side is assigned in <To_spi>.

When only "ah" is used in <sec_type>, the SA registrations relating to the "esp" in the fourth and sixth lines are deleted. When only "esp" is used in <sec_type>, the SA registrations relating to "ah" in the third and fifth lines are deleted. When both "ah" and "esp" are used in <sec_type>, no specific line is deleted from the template and different values incremented by one are assigned in the multiple pieces of <From_spi> and <To_spi>. Specifically, when the SPI of the device at the From side is 0x834, "0x834" is assigned in the <From_spi> in the fifth line and "0x835" is assigned in the <From_spi> in the sixth line. The authentication algorithm and the encryption algorithm common to both the devices are assigned in <ah_algo> and <esp_algo>, respectively. The keys generated for the authentication and the encryption are assigned in <ah_key> and <esp_key>, respectively.

FIG. 10 shows examples of the IPsec settings in Step S816. Particularly, the data in FIG. 10 shows the IPsec settings to be transmitted to the digital camera 102 in Step S415. The data is described in an extensible markup language (XML) format and is enclosed in <ipsec-data> tags. The XML format in which the data is described is not important in this embodiment, and the data may be described in any format that would enable practice of the present invention. The information required for the secure communication, or the information required to ensure the secure communication is, for example, the sec_type indicating the used protocol or the sec_level indicating the level of the secure communication.

An example of the responses (Steps S418 and S419) returned from both the devices in Step S817 is <ipsed-data response=OK/>. The data is described in the XML format, as in the IPsec settings in FIG. 10. If the IPsec settings are successfully set, "OK" is returned as an attribute in the <ipsec-data> tag.

A session termination process (SIP Bye) when the peer-to-peer communication using the IPsec between the digital camera 102 and the printer 101 is to be terminated and a process of deleting the IPsec settings in the security management server 104 will be described below.

Figure 11:
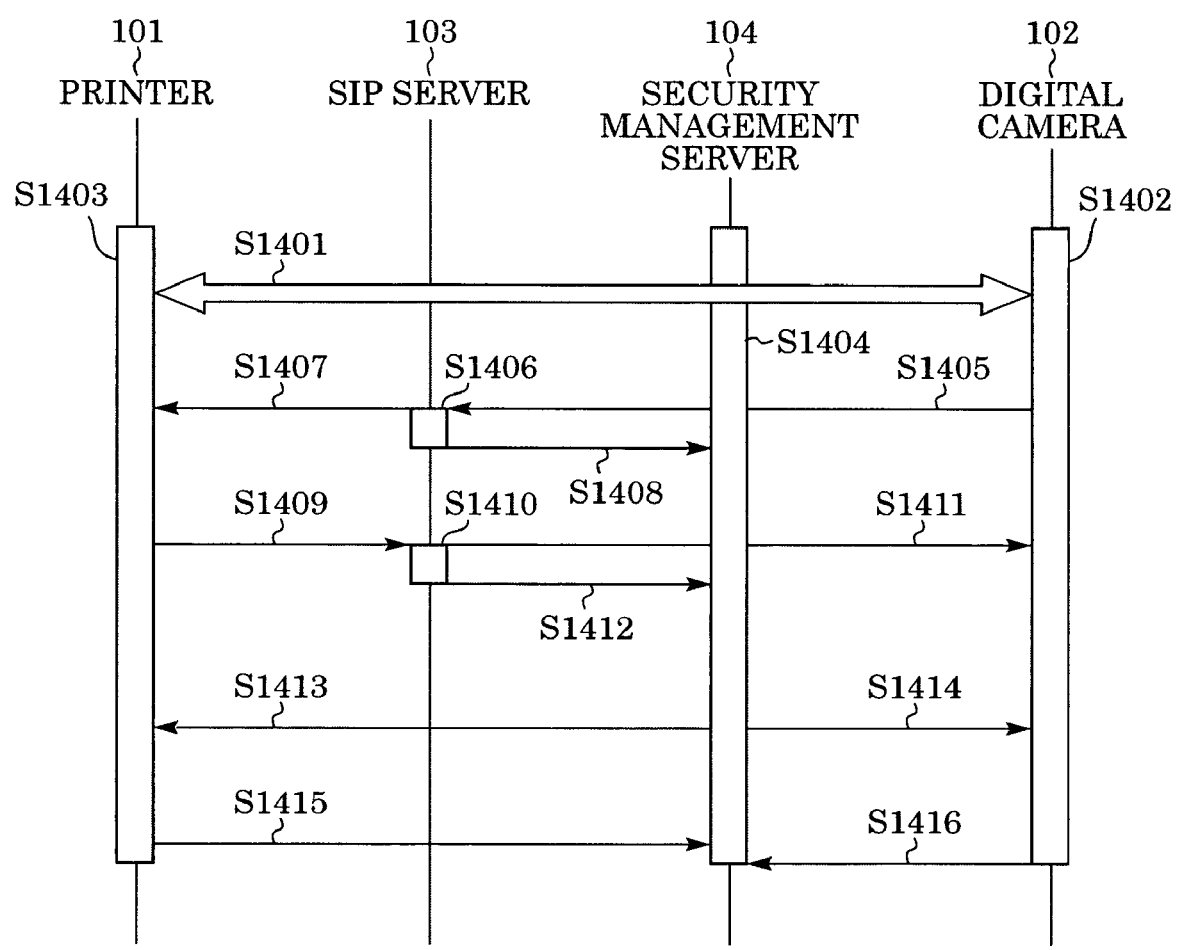
FIG. 11 is another sequence diagram according to an embodiment of the present invention.

FIG. 11 is a sequence diagram according to an embodiment of the present invention. Particularly, a flow upon termination of the peer-to-peer communication using the IPsec between the two devices (the digital camera 102 and the printer 101) will now be described.

In Step S1401, the peer-to-peer communication using the IPsec between the digital camera 102 and the printer 101 is established. Step S1401 corresponds to Step S420 in FIG. 4. Steps S1402 and S1403 indicate the respective states in which the digital camera 102 and the printer 101 have set the IPsec settings used for the peer-to-peer communication. Step S1404 indicates a state in which the security management server 104 manages session information concerning the digital camera 102 and the printer 101.

When the peer-to-peer communication using the IPsec between the digital camera 102 and the printer 101 is terminated, the digital camera 102 starts the session termination process. SIP Bye-related messages are used in the session termination process. The SIP Bye-related messages include a Bye request message to request the termination of a session, a 200OK message in response to the Bye request message, and an error message.

In Step S1405, the digital camera 102 transmits the Bye request message to the printer 101 through the SIP server 103. The ID (the information in the Call-ID tag) of a session to be terminated is described in the Bye request message in Step S1405. In Step S1406, the SIP server 103, which has received the Bye request message from the digital camera 102, checks the destination. In Step S1407, the SIP server 103 transfers the Bye request message to the printer 101 without change. In Step S1408, the SIP server 103 also transfers the Bye request message to the security management server 104 using the fork function described above.

In Step S1409, the printer 101 transmits the 200OK message to the digital camera 102 through the SIP server 103 in response to the Bye request message received in Step S1407. An error message may be transmitted in response to the Bye request message. In Step S1410, the SIP server 103 receives the 200OK message from the printer 101. In Step S1411, the SIP server 103 transfers the 200OK message to the digital camera 102, which is the destination, without change. In Step S1412, the SIP server 103 also transfers the 200OK message to the security management server 104 using the fork function.

The security management server 104 determines the termination of the established session between the digital camera 102 and the printer 101 based on the reception of the SIP Bye-related messages in Steps S1408 and S1412. In Steps S1413 and S1414, the security management server 104 transmits IPsec deletions to the digital camera 102 and the printer 101, respectively, through the processes in FIGS. 12 and 13 described below. The printer 101, which has received the IPsec deletions in S1413, deletes the IPsec settings used in the peer-to-peer communication with the digital camera 102 in the IPsec setting-deletion module 314 and, then in Step S1415, transmits the deletion result to the security management server 104. Similarly, the digital camera 102 deletes the IPsec settings based on the IPsec deletions in Step S1414 and, then in Step S1416, transmits the deletion result to the security management server 104.

The security management server 104, which has received the deletion results in Steps S1415 and S1416, determines that both the devices delete the IPsec settings, and deletes the session information in the session table 303. The data in Steps S1413 to S1416 is securely transferred by encryption communication module 304 and the encryption communication module 313.

Figure 12:
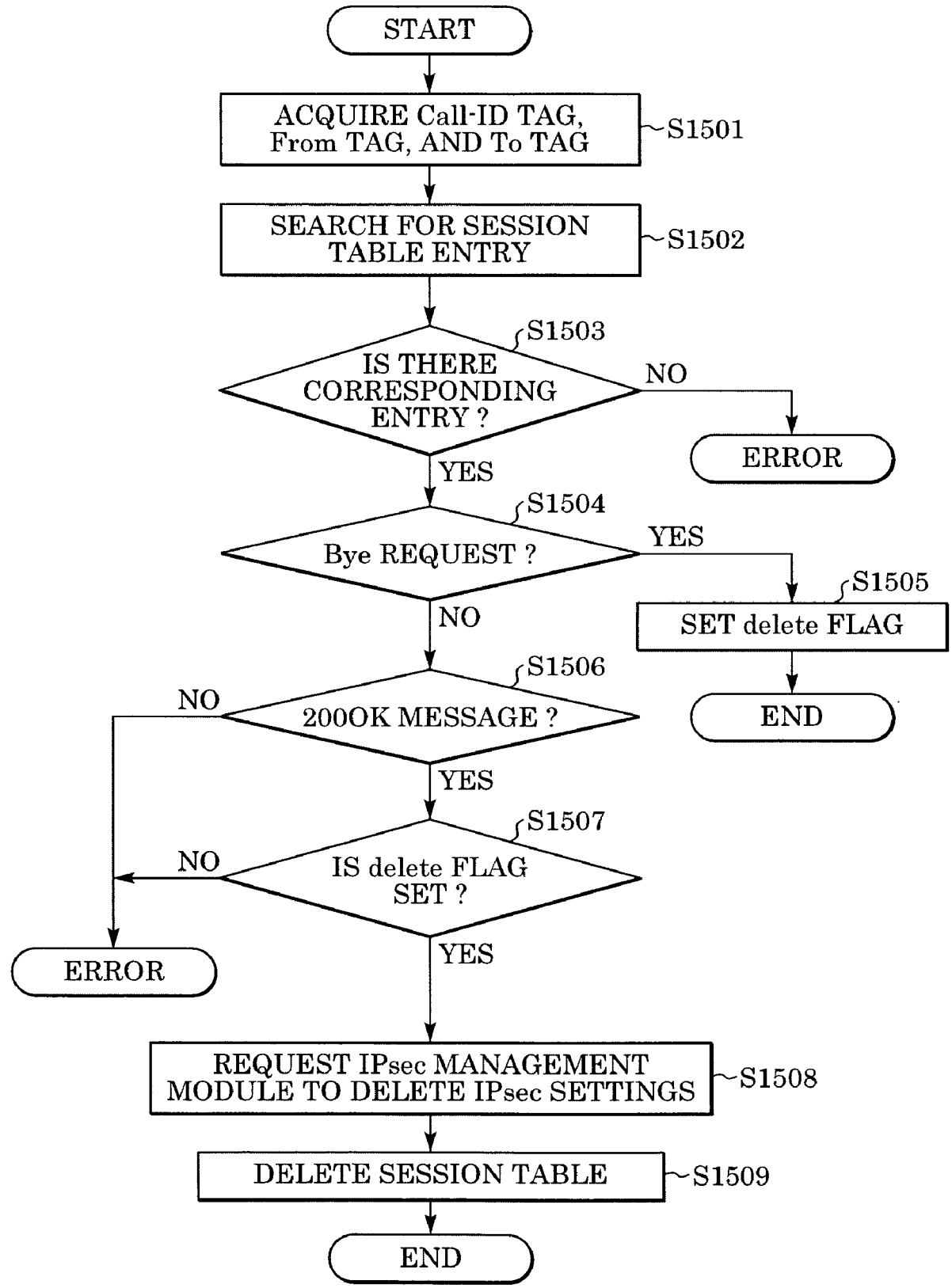
FIG. 12 is a flowchart showing another process performed by the message analysis module.

FIG. 12 is a flowchart showing a process performed by the message analysis module 302 in Step S1404. Particularly, a process of deleting an entry in the session table 303 based on the SIP Bye-related messages (the Bye request message, the 200OK message, an error message in response to the Bye request message, etc.) transferred in the session termination process from the digital camera 102 to the printer 101 will be described.

In Step S1501, the process acquires the information concerning the Call-ID tag, the From tag, and the To tag from the received SIP Bye-related messages. In Step S1502, the process searches the session table 303 for the entry corresponding to the acquired information. In Step S1503, the process determines whether the corresponding entry exists. If the corresponding entry does not exist, an error occurs. If the corresponding entry exists, the process proceeds to Step S1504 to determine the type of the received SIP Bye-related message. If the Bye request message is received, the process proceeds to Step S1505 to set a delete flag and the process terminates.

If the Bye request message is not received in Step S1504, the process proceeds to Step S1506 to determine whether the 200OK message is received. If the 200OK message is received, the process proceeds to Step S1507 to check the flag item in the session table 303 and determines whether the delete flag is set. If the delete flag is set, the process proceeds to Step S1508 to request the IPsec management module 305 to delete the IPsec settings. In Step S1509, the process deletes the corresponding entry in the session table 303. When an error message is received instead of the 200OK message, an error occurs in Step S1506 and the entry in the session table 303 is not deleted.

Figure 13:
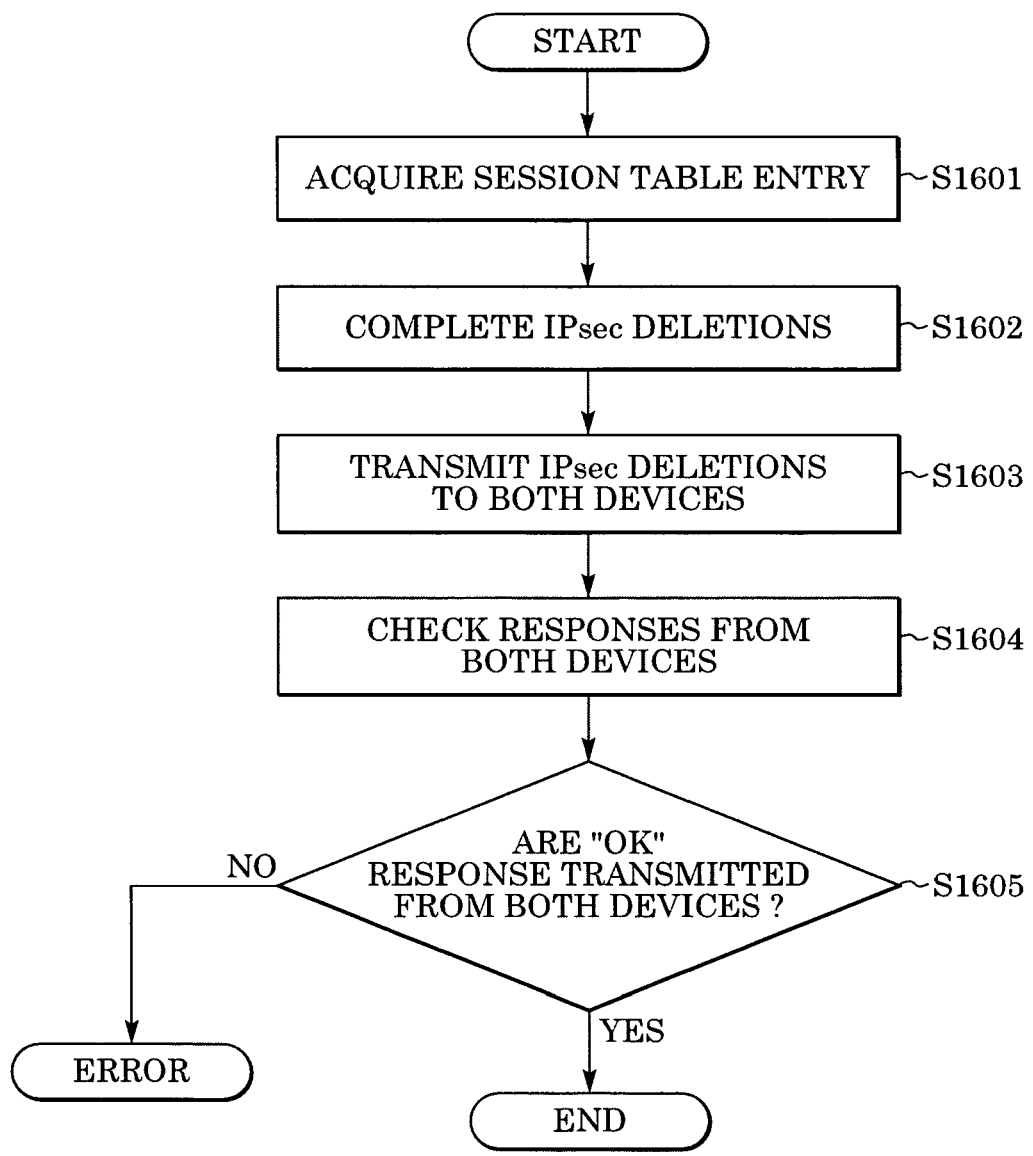
FIG. 13 is a flowchart showing a process of deleting the IPsec settings in the IPsec management module.

FIG. 13 is a flowchart showing the process of deleting the IPsec settings in the IPsec management module 305.

In Step S1601, the process acquires the entry that is the target of the IPsec deletion request from the session table 303. The addresses (the IPv6 addresses or the SIP URIs) of the two devices (the digital camera 102 and the printer 101) to which the IPsec deletions are transmitted are acquired here. In Step S1602, the process generates data to be transmitted from the IPsec deletions that have been already prepared. In Step S1603, the process transmits the IPsec deletions to the two devices (Steps S1413 and S1414 in FIG. 11). In Step S1604, the process receives responses from the two devices (Steps S1415 and S1416 in FIG. 11). In Step S1605, the process determines whether the deletion of the IPsec settings is successfully performed based on the responses transmitted from the two devices. If the deletion of the IPsec settings is successfully performed in both the devices, the process terminates normally. If the deletion of the IPsec settings fails in either of the devices or both the devices, an error occurs.

The following shows an example of the IPsec deletion.

```
<ipsec-data>
spdflush
</ipsec-data>
```

When all the IPsec settings set in the device are to be deleted, the IPsec deletions are common to all the devices. Accordingly, the same IPsec deletions can be transmitted to the corresponding two devices. Although the data is described in the XML format, as in FIG. 10, the data description is not limited to the XML format.

An example of the response data indicating the deletion result, transmitted to the security management server 104, is <ipsec-data response=OK/>. This response data is the same as that in the process of the setting the IPsec settings.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-167213 filed Jun. 4, 2004, which is hereby incorporated by reference herein.

What is claimed is:

1. A providing apparatus that provides information required for secure communication to first and second devices, the providing apparatus comprising:
    a storage medium for storing a computer program for providing the information required for secure information to the first and second devices, the computer program providing for:
        a receiving unit that receives, from a connection apparatus for connecting a first device and the second device, a plurality of messages transmitted from the first device and the second device for establishing a session between the first device and the second device;
        an extracting unit that extracts a first parameter used by the first device for the secure communication and a second parameter used by the second device for the secure communication from the plurality of messages;
        a generating unit that generates the information required for the secure communication based on the parameters extracted from the plurality of messages; and
        a transmitting unit that transmits the information required for the secure communication, generated by the generating unit, to the first and second devices,
    wherein the receiving unit receives the plurality of messages including a first message transmitted from the first device for establishing a session with the second device and a second message indicating that the second device accepts the first message.

2. The providing apparatus according to claim 1, wherein the parameters for the secure communication are parameters used for determining whether authentication or encryption is required to ensure the secure communication is performed.

3. The providing apparatus according to claim 2, wherein the information required for the secure communication, or the information required to ensure the secure communication, is an authentication algorithm or an encryption algorithm required to ensure the secure communication.

4. The providing apparatus according to claim 2, wherein the information required for the secure communication, or the information required to ensure the secure communication, is a key required to ensure the secure communication.

5. A storage medium for storing a computer program of providing information required for secure communication to first and second devices, the computer program comprising instructions for:
    receiving, from a connection apparatus for connecting the first device and the second device, a plurality of messages transmitted from the first device and the second device for establishing a session between the first device and the second device;
    extracting a first parameter used by the first device for the secure communication and a second parameter used by the second device for the secure communication from the plurality of messages;
    generating the information required for the secure communication based on the parameters extracted from the plurality of messages; and
    transmitting the generated information required for the secure communication to the first and second devices,
    wherein the plurality of messages includes a first message transmitted from the first device for establishing a session with the second device, and a second message indicating that the second device accepts the first message.

6. A providing method in which a providing apparatus provides information required for secure communication to first and second devices, the providing method comprising:
    transferring to the providing apparatus, by a connection apparatus for connecting the first device and the second device, a plurality of messages transmitted from the first device and the second device for establishing a session between the first device and the second device;
    extracting, by the providing apparatus, a first parameter used by the first device for the secure communication and device and a second parameter used by the second device for the secure communication from the plurality of messages;
    generating, by the providing apparatus, the information required for the secure communication based on the parameters extracted from the plurality of messages; and
    transmitting the generated information to the first and second devices, by the providing apparatus,
    wherein the plurality of messages transferred by the connection apparatus includes a first message transmitted from the first device for establishing a session with the second device and a second message indicating that the second device accepts the first message.

7. The providing method according to claim 6, wherein the parameters for the secure communication are parameters used for determining whether authentication or encryption required to ensure the secure communication is performed.

8. The providing method according to claim 7, wherein the information required for the secure communication, or the information required to ensure the secure communication, is an authentication algorithm or an encryption algorithm required to ensure the secure communication.

9. The providing method according to claim 7, wherein the information required for the secure communication, or the information required to ensure the secure communication, is a key required to ensure the secure communication.

10. The providing apparatus according to claim 1, wherein the receiving unit receives the plurality of messages including the first message transmitted from the first device for establishing a session with the second device, the second message indicating that the second device accepts the first message, and a third message indicating that the first device receives the second message.

11. The providing apparatus according to claim 10, wherein the transmitting unit transmits the information after the receiving unit received the third message from the connection apparatus.

12. The storage medium according to claim 5, wherein the plurality of messages includes the first message transmitted from the first device for establishing a session with the second device the second message indicating that the second device accepts the first message, and a third message indicating that the first device receives the second message.

13. The providing method according to claim 6, wherein the plurality of messages transferred by the connection apparatus includes the first message transmitted from the first device for establishing a session with the second device, the second message indicating that the second device accepts the first message, and a third message indicating that the first device receives the second message.

14. The providing method according to claim 13, wherein the generated information is transmitted after the proving apparatus received the third message transferred by the connection apparatus.

* * * * *